United States Patent
Tsai et al.

(10) Patent No.: US 8,690,687 B1
(45) Date of Patent: Apr. 8, 2014

(54) MAGNETIC COUPLING ASSEMBLY WITH AN ACTIVELY AIR GAP ADJUSTABLE MECHANISM

(71) Applicant: National Cheng Kung University, Tainan (TW)

(72) Inventors: Mi-Ching Tsai, Tainan (TW); Hung-Shiang Chuang, Kaohsiung (TW); Sheng-He Wang, Tainan (TW); Po-Jen Ko, Chiayi (TW); Kwei-Yuan Chiou, Kaohsiung (TW)

(73) Assignee: National Cheng Kung University, Tainan (TW)

( * ) Notice: Subject to any disclaimer, the term of this patent is extended or adjusted under 35 U.S.C. 154(b) by 0 days.

(21) Appl. No.: 13/681,690

(22) Filed: Nov. 20, 2012

(51) Int. Cl.
*F16D 27/01* (2006.01)

(52) U.S. Cl.
USPC .............................. 464/29; 310/103; 192/84.5

(58) Field of Classification Search
USPC ............... 464/29; 310/323.17, 103, 311, 328; 192/21.5, 84.5
See application file for complete search history.

(56) References Cited

U.S. PATENT DOCUMENTS

| | | | |
|---|---|---|---|
| 2,437,871 A | | 2/1943 | Wood |
| 3,255,853 A | * | 6/1966 | Klass et al. ................... 192/21.5 |
| 3,283,588 A | * | 11/1966 | Merchant ..................... 464/29 X |
| 5,001,382 A | * | 3/1991 | Umeda et al. .................. 310/328 |
| 5,880,548 A | * | 3/1999 | Lamb .............................. 310/103 |
| 6,337,527 B2 | * | 1/2002 | Lamb ........................ 192/84.5 X |
| 6,682,430 B2 | | 1/2004 | Killen |
| 6,800,984 B2 | | 10/2004 | Marth |
| 7,990,007 B2 | | 8/2011 | Corbin, III et al. |
| 2012/0026613 A1 | * | 2/2012 | Suzuki et al. ............. 310/328 X |

* cited by examiner

*Primary Examiner* — Gregory Binda
*Assistant Examiner* — Josh Skroupa
(74) *Attorney, Agent, or Firm* — patenttm.us

(57) ABSTRACT

A magnetic coupling assembly has a supporting base, a first disk, a second disk and two piezoelectric actuators. The piezoelectric actuators are mounted between the supporting base and the first disk to drive the first disk to move along an axial direction of the supporting base and to adjust the air gap between the first and second disks. Each piezoelectric actuator has a housing, a pushing arm and at least one piezoelectric block. The pushing arm is mounted slidably in and extends out of the housing along a longitudinal direction parallel with the axial direction of the supporting base and has an end securely connected with the first disk. The at least one piezoelectric block is mounted in the housing and is attached to the pushing arm to push the pushing arm to move along the longitudinal direction.

19 Claims, 5 Drawing Sheets

MAGNETIC COUPLING ASSEMBLY WITH AN ACTIVELY AIR GAP ADJUSTABLE MECHANISM

BACKGROUND OF THE INVENTION

1. Field of the Invention

The present invention relates to a magnetic coupling assembly, and more particularly to a magnetic coupling assembly to adjust an air gap between two disks with piezoelectric actuators.

2. Description of Related Art

An axial coupling assembly is mounted between a driving element and a driven element to transmission power from the driving element to a driven element. A magnetic coupling assembly is a non-contact coupling assembly and comprises a permanent magnet disk and a magnetically conductive disk spaced from each other to form an air gap between the disks. When the air gap between the disks is adjusted, the magnetic force applied to the magnetically conductive disk from the magnetic disk is changed and the transferring torque of the coupling assembly is also changed to fit with different needs. To adjust the air gap between the disks, an adjusting device is arranged. The conventional adjusting device is mechanical and may include a manual operation type and an auto operation type. In the manual operation type, a mechanism, such as a gear set is provided to enable a user to adjust the air gap manually with the transmission of the mechanism. However, the operation of the conventional manual operation typed adjusting device is laborious and inconvenient in use. In the auto operation type, a motor is provided to serve as a power source so that the air gap can be adjusted automatically. However, the motor has to keep rotating for keeping the air gap in a desired width, the conventional auto operation typed adjusting device is also inconvenient in use.

U.S. Pat. No. 6,682,430, entitled to "Adjustable Magnetic Coupler", provides a push-pull means to move magnet rotors axially and to adjust the width of an air gap. The push-pull means of the '430 patent comprises a mechanism linked between rotors for moving a magnet rotor in response to movement of a magnet rotor and having a link and a swing unit. However, a large driving force is necessary for the operation of the mechanical push-pull means of the '430 patent, and to lubricate the push-pull means of the '430 is difficult. In addition, high heat will generate during the operation of the magnetic coupler of the '430 patent.

To overcome the shortcomings, the present invention tends to provide a magnetic coupling assembly to mitigate or obviate the aforementioned problems.

SUMMARY OF THE INVENTION

The main objective of the invention is to provide a magnetic coupling assembly to adjust an air gap between two disks with piezoelectric actuators.

The magnetic coupling assembly has a supporting base, a first disk, a second disk and two piezoelectric actuators. The supporting base has a first side, a second side opposite to the first side and an axle axially protruding from the second side the supporting base. The first disk is connected to the first side of the supporting base. The second disk is spaced from and magnetically drives with the first disk to form an air gap between the first and second disks. The piezoelectric actuators are mounted between the supporting base and the first disk to drive the first disk to move along an axial direction of the supporting base and to adjust the air gap between the first and second disks. Each piezoelectric actuator has a housing, a pushing arm and at least one piezoelectric block. The housing is securely mounted on the first side of the supporting base. The pushing arm is mounted slidably in and extends out of the housing along a longitudinal direction parallel with the axial direction of the supporting base and has an end securely connected with the first disk. The at least one piezoelectric block is mounted in the housing and is attached to the pushing arm to push the pushing arm to move along the longitudinal direction.

Other objects, advantages and novel features of the invention will become more apparent from the following detailed description when taken in conjunction with the accompanying drawings.

DETAILED DESCRIPTION OF PREFERRED EMBODIMENT

Figure 1:
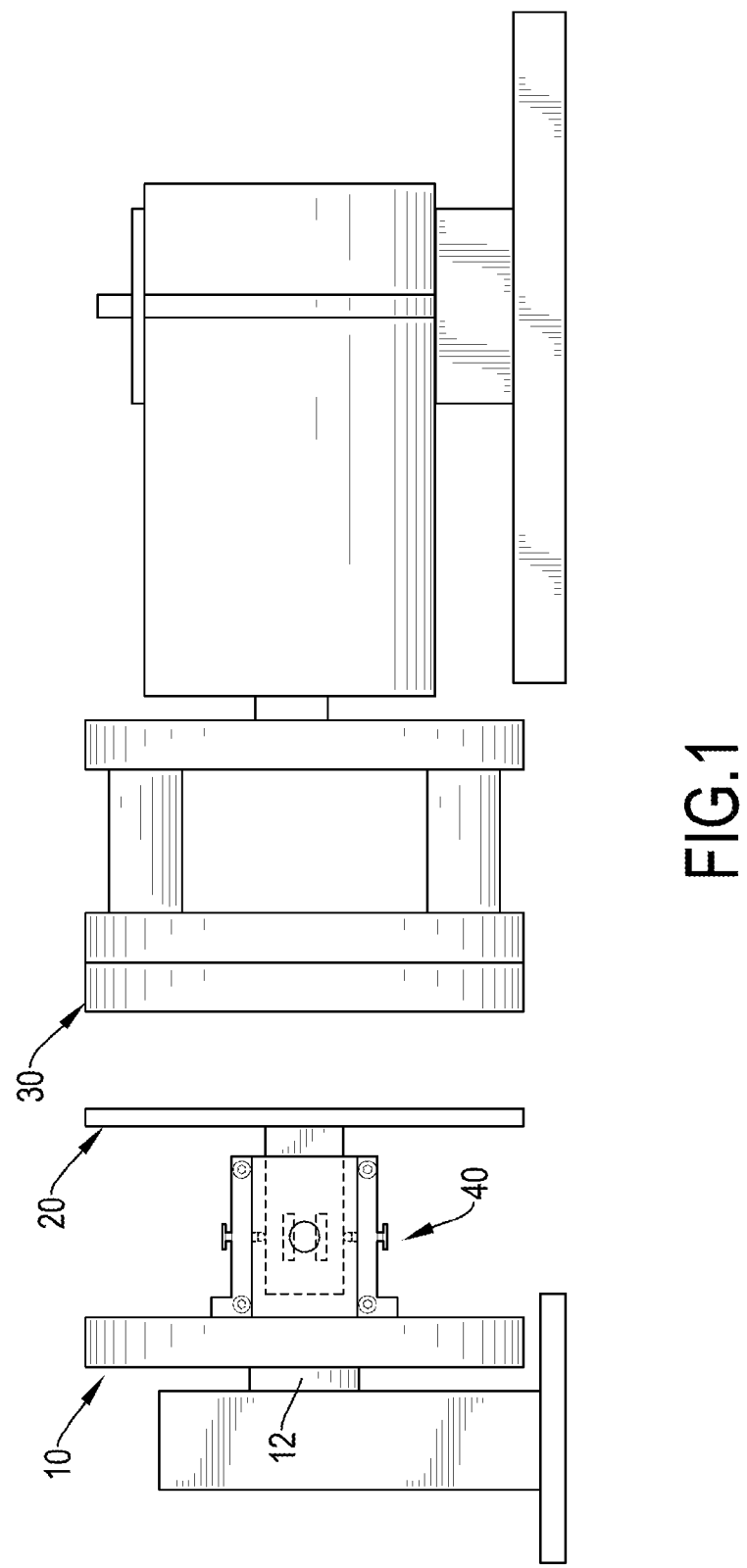
FIG. 1 is a side view of a magnetic coupling assembly in accordance with the present invention.
Figure 2:
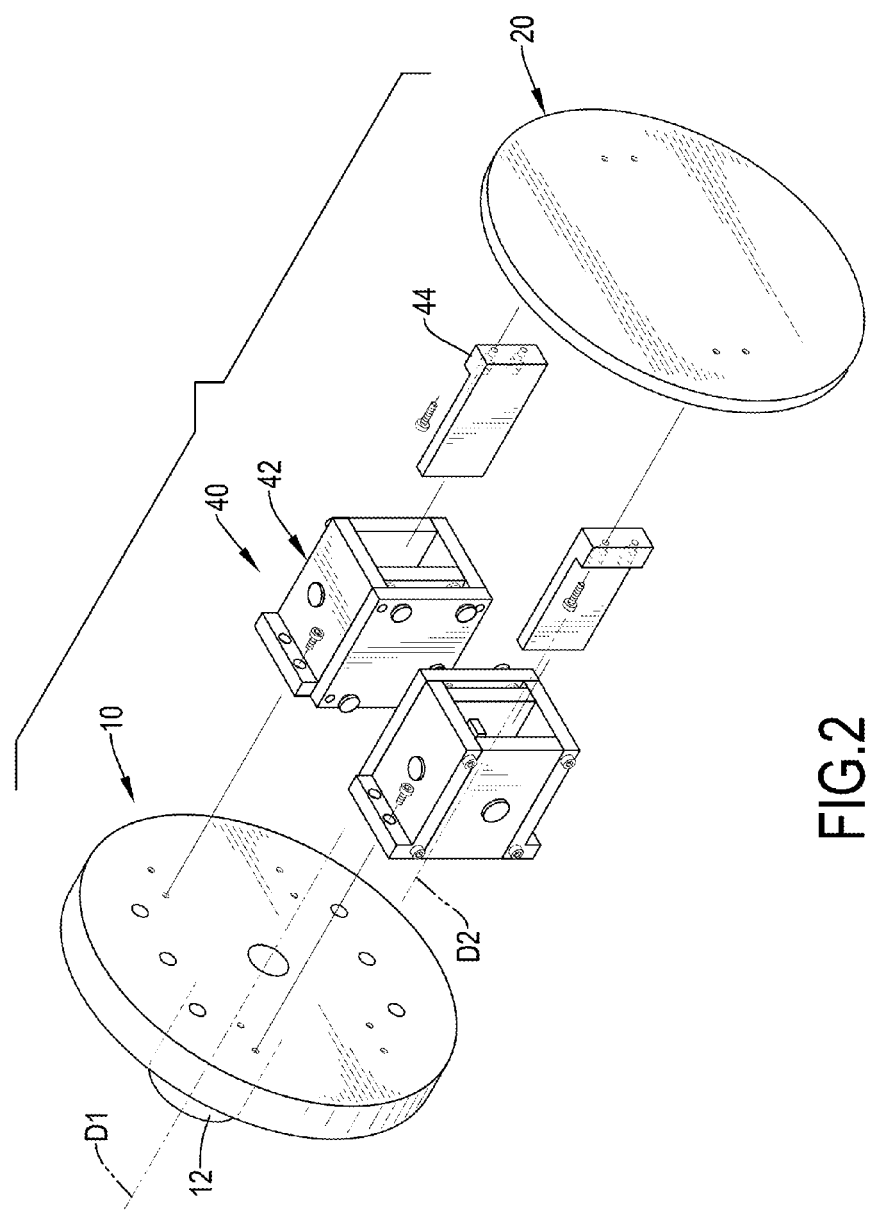
FIG. 2 is an exploded perspective view of the piezoelectric actuators of the magnetic coupling assembly in FIG. 1.

With reference to FIGS. 1 and 2, a magnetic coupling assembly in accordance with the present invention comprises a supporting base 10, a first disk 20, a second disk 30 and two piezoelectric actuators 40. The supporting base 10 has a first side, a second side opposite to the first side and an axle 12 axially protruding from the second side the supporting base 10. The first disk 20 is connected to the first side of the supporting base 10, and the second disk 30 is spaced from and magnetically drives with the first disk 20 to form an air gap between the first and second disks 20, 30. In practice, the first disk 20 is a permanent magnet disk, and the second disk 30 is a magnetically conductive disk. At this time, the first disk 20 can be a driving disk and the supporting base 10 is connected to a power source, such as a motor. The second disk 30 can be a driven disk and is connected to a loading device. In addition, the first disk 20 can be a driven disk and the second disk 30 can be a driving disk. Alternatively, the first disk 20 is a magnetically conductive disk, and the second disk 30 is a permanent magnet disk. In the present invention, the first disk 20 and the second disks 30 are not limited to serve as a driving disk or a driven disk.

Figure 3:
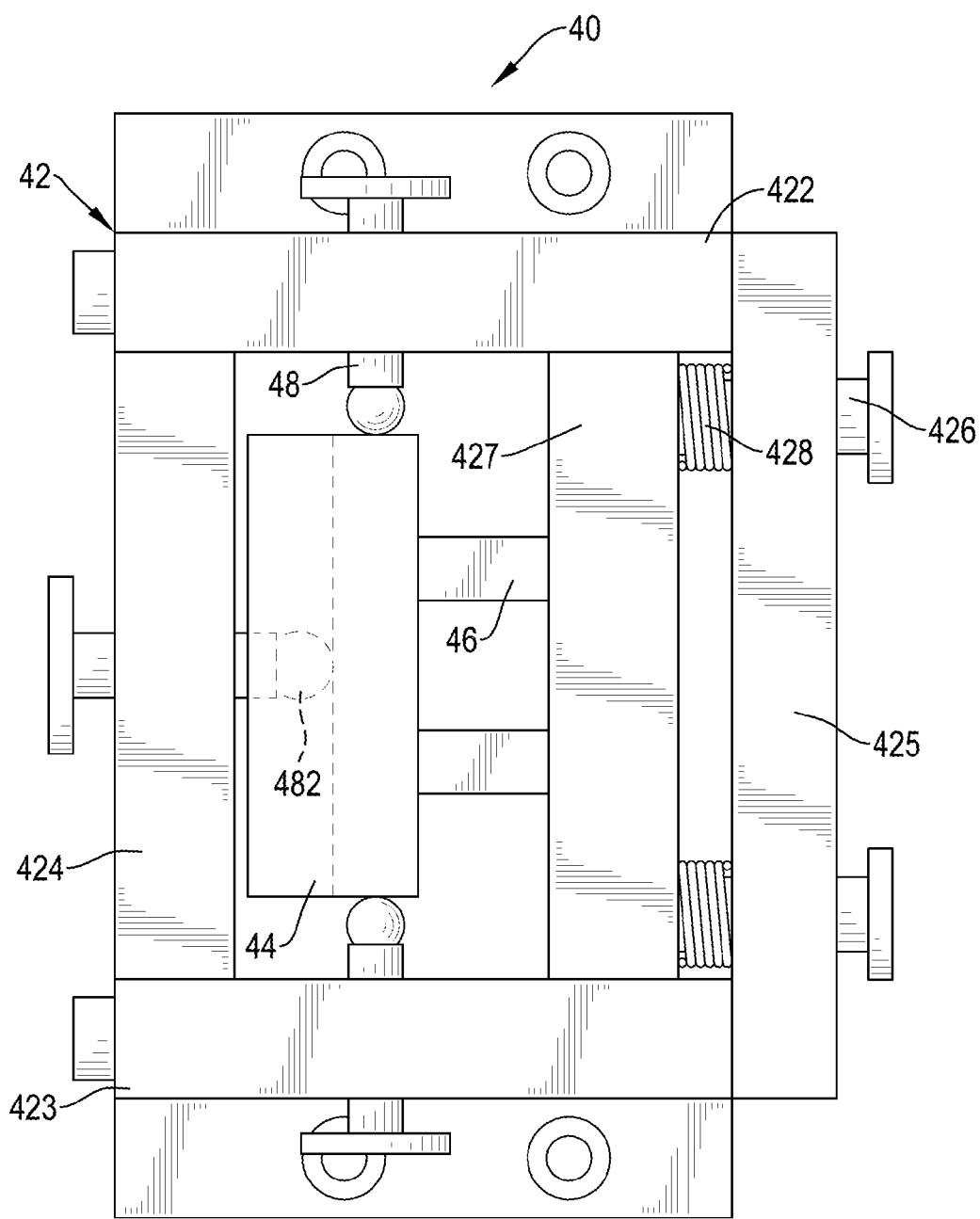
FIG. 3 is an enlarged end view of the piezoelectric actuator in FIG. 2.
Figure 4:
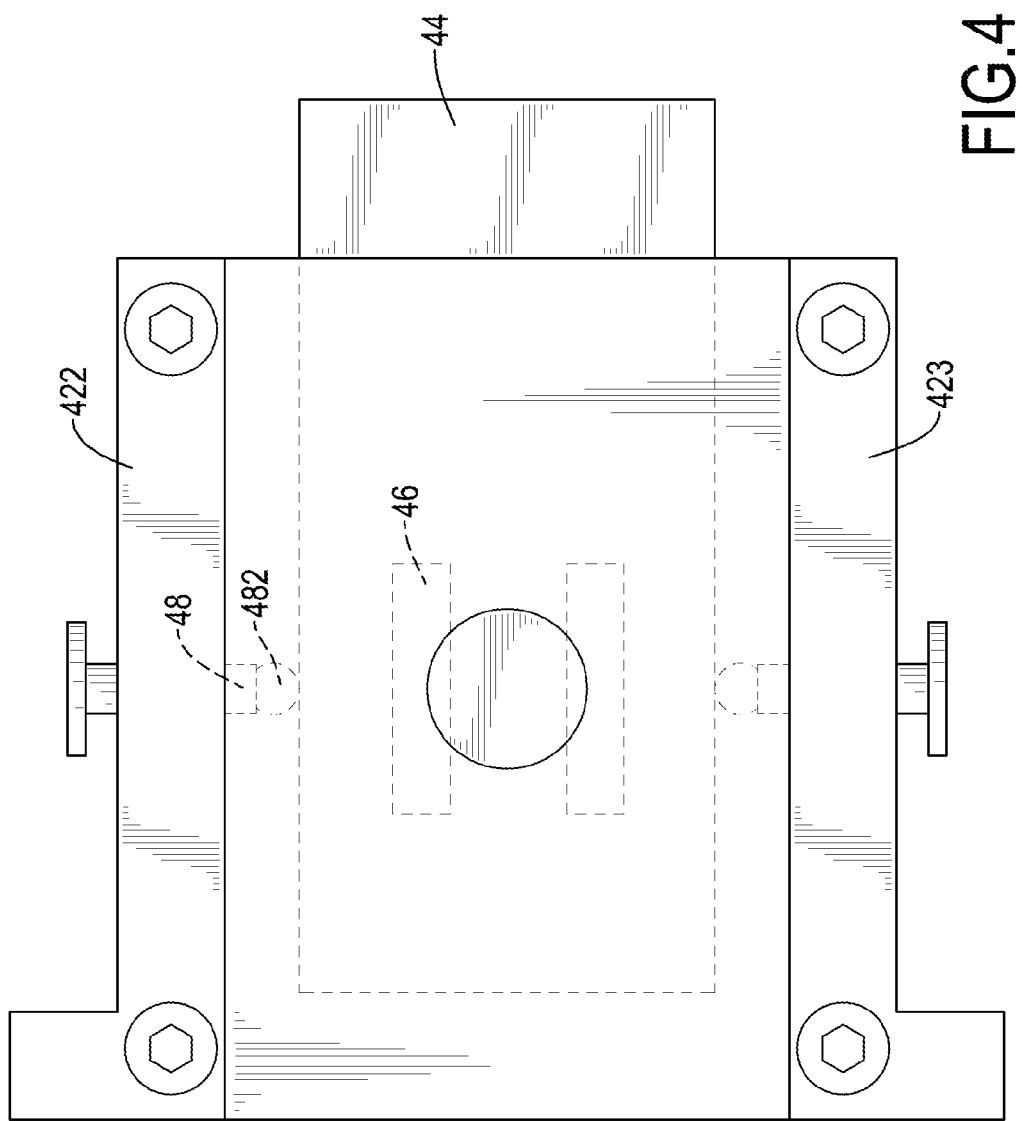
FIG. 4 is an enlarged side view of the piezoelectric actuator in FIG. 2.

The piezoelectric actuators 40 are mounted between the supporting base 10 and the first disk 20 to drive the first disk 20 to move along an axial direction D1 of the supporting base 10 and to adjust the air gap between the first and second disks 20, 30. Preferably, the piezoelectric actuators 40 are diametrically symmetric to a center of the first side of the supporting disk 10. With further reference to FIGS. 3 and 4, each piezoelectric actuator 40 comprises a housing 42, a pushing arm 44, at least one piezoelectric block 46 and multiple ball screws 48. The housing 42 is securely mounted on the first side of the supporting base 10 and comprises a top panel 422, a bottom panel 423, a side panel 424, a cover 425, multiple adjusting bolts 426, a block mount 427 and multiple springs 428. The top panel 422, the bottom panel 423 and the side panel 424 are connected with each other to form an opening opposite to the side panel 424. The cover 425 is attached to and closes the opening of the housing 42. The adjusting bolts 426 are mounted rotatably through the cover 425, and each adjusting bolt 425 has an en extending into the housing 42. The block mount 427 is securely connected to the ends of the adjusting blots 426. The springs 428 are mounted respectively around the ends of the adjusting blots 426, and each spring 428 has two ends abutting respectively with the block mount 427 and the cover 425.

The pushing arm 44 is mounted slidably in and extends out of the housing 42 along a longitudinal direction D2 parallel with the axial direction D1 of the supporting base 10, may be L-shaped and has an end securely connected with the first disk 20. To hold the pushing arm 44 to move stably along the longitudinal direction D2, the ball screws 48 are arranged. Preferably, three ball screws 48 are implemented, are rotatably mounted on the housing 42 and are respectively mounted rotatably on the top panel 422, the bottom panel 423 and the side panel 424 of the housing 42. Each ball screw 48 has a ball 482 rotatably mounted on the ball screw 48 and rotatably abutting the pushing arm 44 of the piezoelectric actuator 40 to hold the pushing arm 44 to stably move along the longitudinal directions D2.

The at least one piezoelectric block 46 is mounted in the housing 42, is preferably mounted on the block mount 427 and is attached to the pushing arm 44 to push the pushing arm 44 to move along the longitudinal direction D2. Preferably, two piezoelectric blocks 46 are implemented on each piezoelectric actuator 40 and are spaced from each other.

Figure 5:
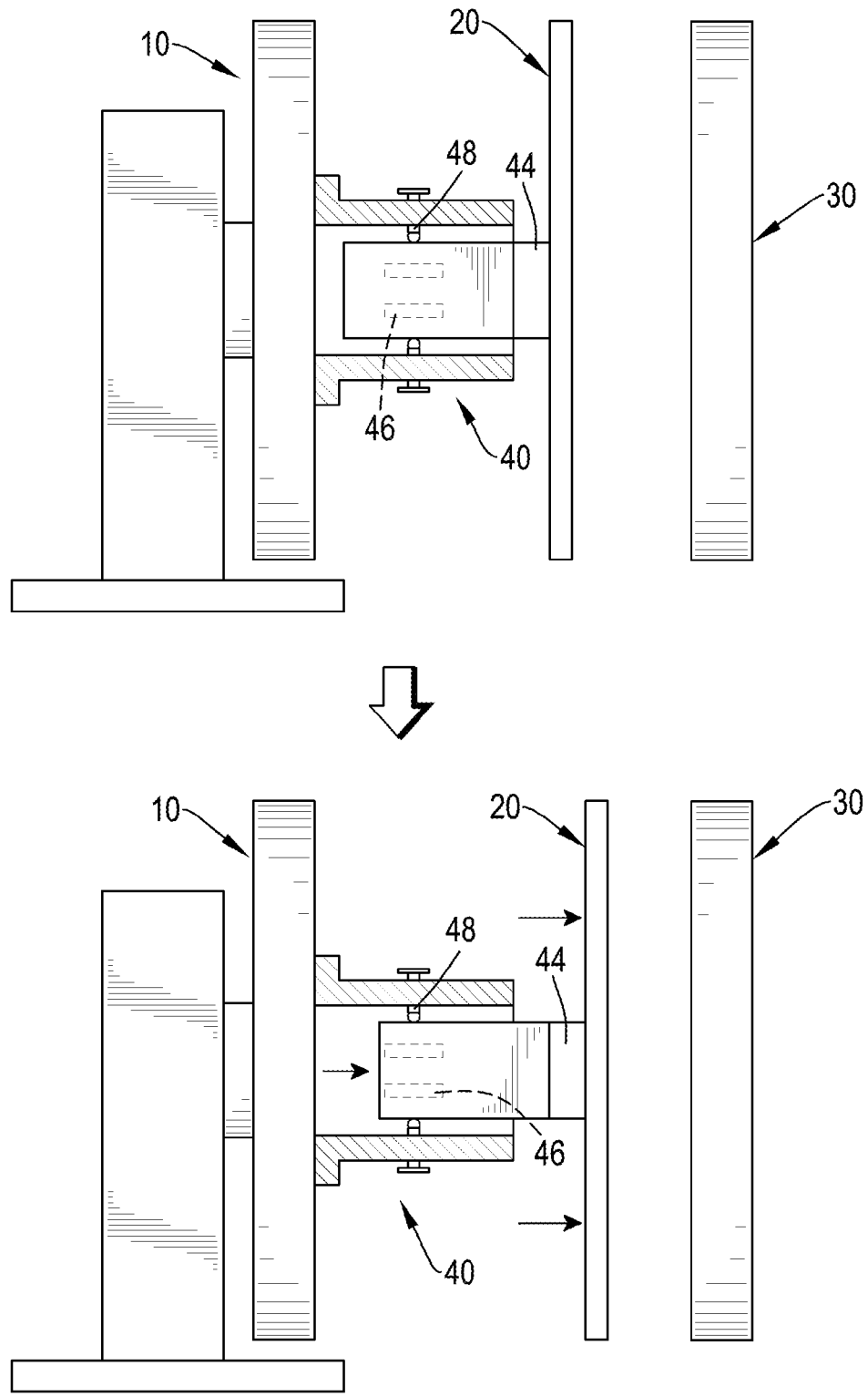
FIG. 5 shows operational side views in partial section of the magnetic coupling assembly in FIG. 1.

With reference to FIG. 5, when the piezoelectric blocks 46 of the piezoelectric actuators 40 are powered on and a driving signal is sent to the piezoelectric blocks 46, the pushing arms 44 will be moved along the longitudinal directions D2 with the vibrations generated by the piezoelectric blocks 46. Consequently, the first disk 20 that is connected to the pushing arms 44 of the piezoelectric actuators 40 can be moved along the axial direction D1 of the supporting base 10, such that the width of the air gap between the disks 20, 30 can be changed and the transferring torque of the magnetic coupling assembly can also be changed.

When the piezoelectric blocks 46 are powered off, the piezoelectric blocks 46 are locked and the pushing arms 44 are kept from moving. Accordingly, the air gap between the disks 20, 30 can be kept in a desired width without any additional power. Accordingly, the structure of the magnetic coupling assembly can be simplified, and a large driving force is unnecessary for the operation of the piezoelectric actuators 40. In addition, the operation of the piezoelectric actuators 40 will not generate high heats, and the magnetic coupling assembly is convenient and power saving in use.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A magnetic coupling assembly comprising:
   a supporting base having a first side, a second side opposite to the first side and an axle axially protruding from the second side the supporting base;
   a first disk connected to the first side of the supporting base;
   a second disk spaced from and magnetically driving with the first disk to form an air gap between the first and second disks; and
   two piezoelectric actuators mounted between the supporting base and the first disk to drive the first disk to move along an axial direction of the supporting base and to adjust the air gap between the first and second disks, and each piezoelectric actuator comprising
      a housing securely mounted on the first side of the supporting base;
      a pushing arm mounted slidably in and extending out of the housing along a longitudinal direction parallel with the axial direction of the supporting base and having an end securely connected with the first disk; and
      at least one piezoelectric block mounted in the housing and attached to the pushing arm to push the pushing arm to move along the longitudinal direction.

2. The magnetic coupling assembly as claimed in claim 1, wherein the piezoelectric actuators are diametrically symmetric to a center of the first side of the supporting disk.

3. The magnetic coupling assembly as claimed in claim 2, wherein each piezoelectric actuator further has multiple ball screws rotatably mounted on the housing, and each ball screw has a ball rotatably mounted on the ball screw and rotatably abutting the pushing arm of the piezoelectric actuator to hold the pushing arm to stably move along the longitudinal direction.

4. The magnetic coupling assembly as claimed in claim 3, wherein each piezoelectric actuator has piezoelectric blocks spaced from each other.

5. The magnetic coupling assembly as claimed in claim 4, wherein the housing of each piezoelectric actuator comprises
   a top panel, a bottom panel and a side panel connected with each other to form an opening opposite to the side panel;
   a cover attached to and closing the opening of the housing;
   multiple adjusting bolts mounted rotatably through the cover, and each adjusting bolt having an end extending into the housing;
   a block mount on which the piezoelectric blocks are securely mounted, securely connected to the ends of the adjusting bolts; and
   multiple springs mounted respectively around the ends of the adjusting bolts, and each spring having two ends abutting respectively with the block mount and the cover.

6. The magnetic coupling assembly as claimed in claim 5, wherein each piezoelectric actuator has three ball screws respectively mounted rotatably on the top panel, the bottom panel and the side panel of the housing of the piezoelectric actuator.

7. The magnetic coupling assembly as claimed in claim 6, wherein the first disk is a permanent magnet disk and the second disk is a magnetically conductive disk.

8. The magnetic coupling assembly as claimed in claim 6, wherein the first disk is a magnetically conductive disk and the second disk is a permanent magnet disk.

9. The magnetic coupling assembly as claimed in claim 1, wherein each piezoelectric actuator further has multiple ball screws rotatably mounted on the housing, and each ball screw has a ball rotatably mounted on the ball screw and rotatably abutting the pushing arm of the piezoelectric actuator to hold the pushing arm to stably move along the longitudinal direction.

10. The magnetic coupling assembly as claimed in claim 9, wherein each piezoelectric actuator has piezoelectric blocks spaced from each other.

11. The magnetic coupling assembly as claimed in claim 10, wherein the housing of each piezoelectric actuator comprises a top panel, a bottom panel and a side panel connected with each other to form an opening opposite to the side panel;

a cover attached to and closing the opening of the housing;

multiple adjusting bolts mounted rotatably through the cover, and each adjusting bolt having an end extending into the housing;

a block mount on which the piezoelectric blocks are securely mounted, securely connected to the ends of the adjusting bolts; and multiple springs mounted respectively around the ends of the adjusting bolts, and each spring having two ends abutting respectively with the block mount and the cover.

12. The magnetic coupling assembly as claimed in claim 11, wherein each piezoelectric actuator has three ball screws respectively mounted rotatably on the top panel, the bottom panel and the side panel of the housing of the piezoelectric actuator.

13. The magnetic coupling assembly as claimed in claim 12, wherein the first disk is a permanent magnet disk and the second disk is a magnetically conductive disk.

14. The magnetic coupling assembly as claimed in claim 12, wherein the first disk is a magnetically conductive disk and the second disk is a permanent magnet disk.

15. The magnetic coupling assembly as claimed in claim 1, wherein each piezoelectric actuator has piezoelectric blocks spaced from each other.

16. The magnetic coupling assembly as claimed in claim 1, wherein the housing of each piezoelectric actuator comprises a top panel, a bottom panel and a side panel connected with each other to form an opening opposite to the side panel;

a cover attached to and closing the opening of the housing;

multiple adjusting bolts mounted rotatably through the cover, and each adjusting bolt having an end extending into the housing;

a block mount on which the at least one piezoelectric block is securely mounted, securely connected to the ends of the adjusting bolts; and multiple springs mounted respectively around the ends of the adjusting bolts, and each spring having two ends abutting respectively with the block mount and the cover.

17. The magnetic coupling assembly as claimed in claim 16, wherein each piezoelectric actuator has three ball screws respectively mounted rotatably on the top panel, the bottom panel and the side panel of the housing of the piezoelectric actuator, and each ball screw has a ball rotatably mounted on the ball screw and rotatably abutting the pushing arm of the piezoelectric actuator to hold the pushing arm to stably move along the longitudinal direction.

18. The magnetic coupling assembly as claimed in claim 1, wherein the first disk is a permanent magnet disk and the second disk is a magnetically conductive disk.

19. The magnetic coupling assembly as claimed in claim 1, wherein the first disk is a magnetically conductive disk and the second disk is a permanent magnet disk.

* * * * *